(12) United States Patent
Ernst

(10) Patent No.: US 6,298,371 B1
(45) Date of Patent: Oct. 2, 2001

(54) METHOD OF DYNAMICALLY ADJUSTING NCP PROGRAM MEMORY ALLOCATION OF SNA NETWORK

(75) Inventor: Theodore R. Ernst, Sugar Land, TX (US)

(73) Assignee: BMC Software, Inc., Sugar Land, TX (US)

(*) Notice: Subject to any disclaimer, the term of this patent is extended or adjusted under 35 U.S.C. 154(b) by 0 days.

(21) Appl. No.: 08/550,999

(22) Filed: Oct. 31, 1995

Related U.S. Application Data

(63) Continuation of application No. 08/089,269, filed on Jul. 8, 1993, now abandoned.

(51) Int. Cl.[7] ................................................. G06F 17/00
(52) U.S. Cl. ........................................... 709/104; 709/226
(58) Field of Search ................................ 709/226, 203, 709/224, 215, 101, 102, 104; 710/56

(56) References Cited

U.S. PATENT DOCUMENTS

| | | | |
|---|---|---|---|
| 4,292,669 | * 9/1981 | Wollum et al. | 395/275 |
| 4,603,382 | * 7/1986 | Cole et al. | 364/200 |
| 4,677,616 | * 6/1987 | Franklin | 370/94 |
| 4,809,155 | * 2/1989 | Costes et al. | 364/200 |
| 5,093,912 | * 3/1992 | Dong et al. | 395/650 |
| 5,313,582 | * 5/1994 | Hendel et al. | 395/250 |
| 5,317,739 | * 5/1994 | Elko et al. | 395/650 |
| 5,333,269 | * 7/1994 | Calvignac et al. | 395/325 |

OTHER PUBLICATIONS

Handouts from SHARE 69 Conference, Session C162—NCP Performance & Tuning, Aug. 27, 1987, Chicago, Illinois.

Handouts from SHARE 72 Conference, Session C207—NCP Tuning, Mar. 1, 1989, Los Angeles, California.

Handouts from SHARE 74 Conference, Virtual Route Performance Analysis Session, Mar. 4–9, 1990, Anaheim, California.

* cited by examiner

Primary Examiner—Larry D. Donaghue
(74) Attorney, Agent, or Firm—Howrey Simon Arnold & White, LLP

(57) ABSTRACT

A method in accordance with the invention is implemented via a novel computer program referred to for convenience as NEWPROG. NEWPROG resides (executes) in one or more communication controllers on a SNA network "front end" processor for the NCP executing in that controller. NEWPROG makes it possible for the NCP memory management routines to dynamically increase the number of control blocks by scavenging available NCP memory. Those control blocks created by NEWPROG may also be deleted. Use of the method permits the NCP to improve its resource availability by generating user requested control block structures as needed (within total NCP load memory limitations).

7 Claims, 11 Drawing Sheets

METHOD OF DYNAMICALLY ADJUSTING NCP PROGRAM MEMORY ALLOCATION OF SNA NETWORK

This application is a continuation of application Ser. No. 08/089,269, filed Jul. 8, 1993, now abandoned entitled Method of Dynamically Adjusting NCP Program Memory Allocation for SNA Networks.

BACKGROUND OF THE INVENTION

The invention relates to a method of dynamically altering the memory management procedures of the Network Control Program's (NCP's) in a Systems Network Architecture (SNA) network. For purposes of illustration, one implementation of the invention is described in connection with the well-known IBM Virtual Terminal Access Method (VTAM) software running on IBM or plug-compatible mainframe computers. It will be appreciated by those of ordinary skill having the benefit of this disclosure that the invention can be similarly implemented in other SNA-compliant networks, e.g., those involving an IBM AS/400 or similar computer. (This application is related to my commonly-assigned application Ser. No. 08/001,195, filed Jan. 7, 1993, which is incorporated by reference).

Details of the NCP program and its operational characteristics as part of the SNA protocol are extensively documented in a variety of widely available publications and other references. The IBM publications "SNA Technical Overview," publication no. GC30-3073-3, hereafter "[SNATechOv]," and "NCP Version 5 Network Performance and Tuning," publication no. GG24-3469, are incorporated by reference as nonessential background information familiar to those of ordinary skill. Chapters 1 and 2 and the glossary of [SNATechOv] are, potentially, especially helpful.

Appendix 1 sets out selected source code extracts from a copyrighted commercial software package distributed by the assignee of this application under the trademark OPERTUNE which manifests the invention. Permission is granted to make copies of the appendix solely in connection with the making of facsimile copies of this application in accordance with applicable law; all other rights are reserved, and all other reproduction, distribution, creation of derivative works based on the contents, public display, and public performance of the microfiche appendices or any part thereof are prohibited by the copyright laws.

1.2 Overview of SNA Architecture & Glossary of Terms

The concepts discussed in the overview explanation that follow are illustrated in FIG. 1, which is a block diagram showing the hierarchical nature of the SNA architecture.

SNA was developed as a hierarchical architecture organized into groups that have specific functions. SNA "nodes" are collected into a structure of "networks," "domains," and "subareas" as explained in the following glossary of selected terms well known to those of ordinary skill:

37xx: the product number of a series of communication controllers introduced by IBM between 1975 and the present. The 37xx series controllers execute a software program called Network Control Program (NCP) that controls and directs communication controller activity. These controllers are responsible for relieving the central processing unit of much of the burden of communications management.

Boundary link: a link comprising part of a path between two SNA nodes and physically terminating in or attached to one of the nodes. See also Intermediate link.

Channel: an SNA channel (sometimes referred to as a "370 data channel") is a communications path, largely local to a host computer and its on-site peripherals, that makes use of a specific SNA communications protocol. See [SNATechOv], FIGS. 1–3. Channels are sometimes referred to colloquially as "channel attachments" attached to a host computer. The protocol used in channel attachments is characterized by comparatively high data throughput, e.g., 3 million bytes per second (Mbps) and higher.

Controller: a communication's controller (sometimes referred to as a "cluster controller") provides an interface between an SNA network and one or more end users at terminals to the SNA network. It buffers the entries that users make at their terminals. When polled by the NCP, the cluster controller delivers the buffers to the NCP. When the NCP selects and delivers messages to the cluster controller, the cluster controller receives the buffers and delivers each message to the correct terminal.

Domain: all subareas that are controlled by a common VTAM (P5) node.

FEP: Front End Processor, a name given to the 37xx series and compatible communication controllers.

Intermediate link: a link comprising an intermediate part of a path between two SNA nodes but not physically terminating in or attached to either node. See also Boundary link.

Load module: a module of executable program code and preallocated/preformatted memory loaded into NCP processor memory during NCP initialization. The load module provides the data storage and manipulation routines necessary for NCP execution.

Link: a communications path between two nodes in a SNA network, normally operating in conformance with the Synchronous Data Link Control (SDLC) communications protocol.

LU: logical unit.

NCP: see Network Control Program.

Network: all connected domains.

Network architecture: the rules that govern the services, functions, and protocols of network components. A widely used network architecture is the Systems Network Architecture (SNA) developed by IBM.

Network Control Program (NCP): an IBM computer program that executes in the communication controller's hardware to perform the work of network communication for remote connections. The NCP polls the cluster controllers to send and receive messages and controls dialing and answering modems that are attached to it. The NCP routes messages that are destined for other subareas.

Network resource: the speed or capacity of a physical network component that is needed by network users to move data from one point to another in a network.

Network user: an end user or application that requires network resources to complete assigned tasks.

Node: a set of hardware, and the software associated with that hardware, that implements all seven standard layers of the SNA architecture (which are physical control, data link control, path control, transmission control, data flow control, presentation services, and transaction services).

Overutilization: a network problem that occurs when the number of network users exceeds the capacity of a network resource. Network users must either accept less of the resource than they requested, or wait longer to acquire the requested amount. See also Underutilization.

P2: a designation for a cluster controller.

P4: a designation for an NCP node.

P5: a designation for a VTAM node.

Path information unit: a unit of message traffic.

PIU: path information unit.

PU: physical unit.

SDLC: Synchronous Data Link Control.

Session: a connection between two logical units (e.g., two applications or an application and an end user) that establishes the rules and a path for communication between the two. All sessions are initiated through a host processor executing VTAM. Two logical units that are connected in this way are often referred to as being "in session."

SNA: Systems Network Architecture.

Subarea: a VTAM or NCP node (P5 or P4) and all the cluster controllers (P2s) or token rings that are attached and controlled by it.

Underutilization: a network problem that occurs when much of the capacity of a network resource is not needed by network users and is being wasted. See also Overutilization.)

DOS/VSE: Disk Operating System/Virtual Storage Extended. A mainframe operating systems developed by IBM that is an extension of an earlier operating system, Disk Operating System/Virtual Storage (DOS/VS).

VTAM: Virtual Telecommunications Access Method software. VTAM executing in a host processor system controls the interface between host applications and the network. It also maintains the domain configuration and initiates communications called "sessions" between the other network components. A newer type of SNA component can initiate sessions between two PU nodes without VTAM; a process known as Advanced Peer-to-Peer Networking or "APPN.")

1.3 Initialization of a SNA Network

A key aspect of the background of the invention is the manner in which initialization of a SNA network is normally accomplished. As is well known to those of ordinary skill, during initialization of a network a customized NCP program "load module" is created for each communications controller or FEP by a network administrator who runs one or more utility programs to link selected program components together. The network administrator's customization of each load module includes selecting appropriate values for various NCP parameters that are discussed in more detail below.

Load modules are selectively downloaded from a host computer running VTAM to one or more selected controllers on the network over a channel or link. The controller stores the load module into local storage and formats its remaining storage for use as buffers for incoming and outgoing network traffic.

Importantly in the context of the invention, an initialized NCP has a predetermined amount of memory to use during network control operations. This memory is divided between message buffers and NCP control block buffers. Message buffers are used by active processes to communicate or exchange data. Control block buffers are used by the NCP to represent different types of active processes. Current techniques do not allow the quantity, or distribution, of this (buffer) memory to be changed during normal operations. The only way to change the amount or distribution of NCP buffer space is to regenerate (e.g., respecify) and reinitialize (initialize and download a new NCP process) the NCP process.

1.4 Overview of Selected NCP Operational Aspects

During normal network operations the primary function of the NCP is session management. A typical NCP may be connected as shown in FIG. 2. NCP 201 represents each of the resources (e.g., hardware devices or software application) connected to it (boxes 203, 205, 207, 209, and 211) with control blocks. Each control block is a piece of memory that contains information about its particular resource such as the resources' model number, what operations it can perform, what operations it is not allowed to perform, etc.

Different types of resources require the use of different types of control blocks within the NCP. At initialization time NCP 201 is instantiated with a number of blank control blocks of various types. As different resources attach themselves to the NCP an appropriate, predefined, control block structure is used to represent the new resource.

Collections of unused control blocks are called "pools." There is a pool for each type of control block. The NCP keeps track of control blocks within a pool through the use of "free chains" and "anchor" blocks. See FIG. 3. Anchor block 301 is a control block whose position is known to the NCP and through which the NCP accesses the associated pool's available control blocks 303 and 305. Free chains operate like singly-linked lists of control blocks. All available (i.e., unused) control blocks are kept in free chains.

The NCP is also responsible for managing the communication between two active processes whose link passes through the NCP. In this case, message buffers are used to encapsulate chunks of information for transmission from one user (or application or device) to another. Message buffers are similar to control blocks in that they are pieces of memory that are used by the NCP during information transfer operations.

The size and number of message buffers is, as with control blocks, determined at NCP initialization time. Message buffers are also managed through the NCP's use of anchor blocks and free chains. All available (i.e., unused) message buffers are kept in a free chain.

Additionally, each message buffer has associated with it use-flag and eye-catcher fields. See FIG. 4. The use-flag 403 is a text field that indicates if the message buffer is free (by the pattern *00* for example) or in use (by the pattern *80* for example). The eye-catcher 405 is also a text field (*C2* for example) and signifies the beginning of the buffer's memory. All message buffer memory not occupied by either the use-flag or eye-catcher, 407, is available for data.

1.5 Limitations of Current NCP Operations

Current techniques, as defined by the IBM NCP protocol, allow for the dynamic use of predefined control blocks. The concept behind this technique is that although a control block need not be defined at initialization time for every resource that could be used, the absolute number of control block structures instantiated at NCP initialization time is predefined. Thus, during normal operations a shortage of control blocks may still develop.

For instance, as network size and complexity increases or current network loads change, the number of available control blocks (of a specific type) may go to zero. When this happens no new processes dependent upon that type of control block may be initiated—the system has no means of representing, or acknowledging, the requesting resource. Typically this happens during the busiest time of the day, when a large number of people are trying to log onto the network. Having a sufficient number of control blocks for all requesting users, or resources, has nothing to do with performance but is strictly a matter of availability.

To utilize fully a SNA network it is desirable not to let an artificial limit on resources (i.e., control block availability) limit a user's access to the network. One approach to this problem is to allow the NCP process control the creation, and deletion, of control blocks on an "as needed" basis.

2. SUMMARY OF THE INVENTION

A method in accordance with the invention is implemented via a novel computer program referred to for convenience as NEWPROG. NEWPROG resides (executes) in one or more communication controllers on a SNA network "front end" processor for the NCP executing in that controller. NEWPROG makes it possible for the NCP memory management routines to increase dynamically the number of possible control blocks by scavenging available NCP memory. Those control blocks created by NEWPROG may also be deleted. Use of the method permits the NCP to improve its resource availability by generating user requested control block structures as needed (within total NCP load memory limitations).

3. BRIEF DESCRIPTION OF THE DRAWINGS

4. DETAILED DESCRIPTION OF SPECIFIC EMBODIMENT

One illustrative embodiment of a method in accordance with the invention is described in some detail below. In the interest of clarity, not all features of an actual implementation are described in this specification. In the development of any such actual implementation, as in any software development project, numerous programming decisions must me made to achieve the developer's specific goals, which will vary from one implementation to another. Thus, development of a specific implementation of the invention can be expected to be complex and time consuming, but would nevertheless be a routine undertaking of program development for those of ordinary skill having the benefit of this disclosure.

4.1 Overview of Invention

Figure 1:
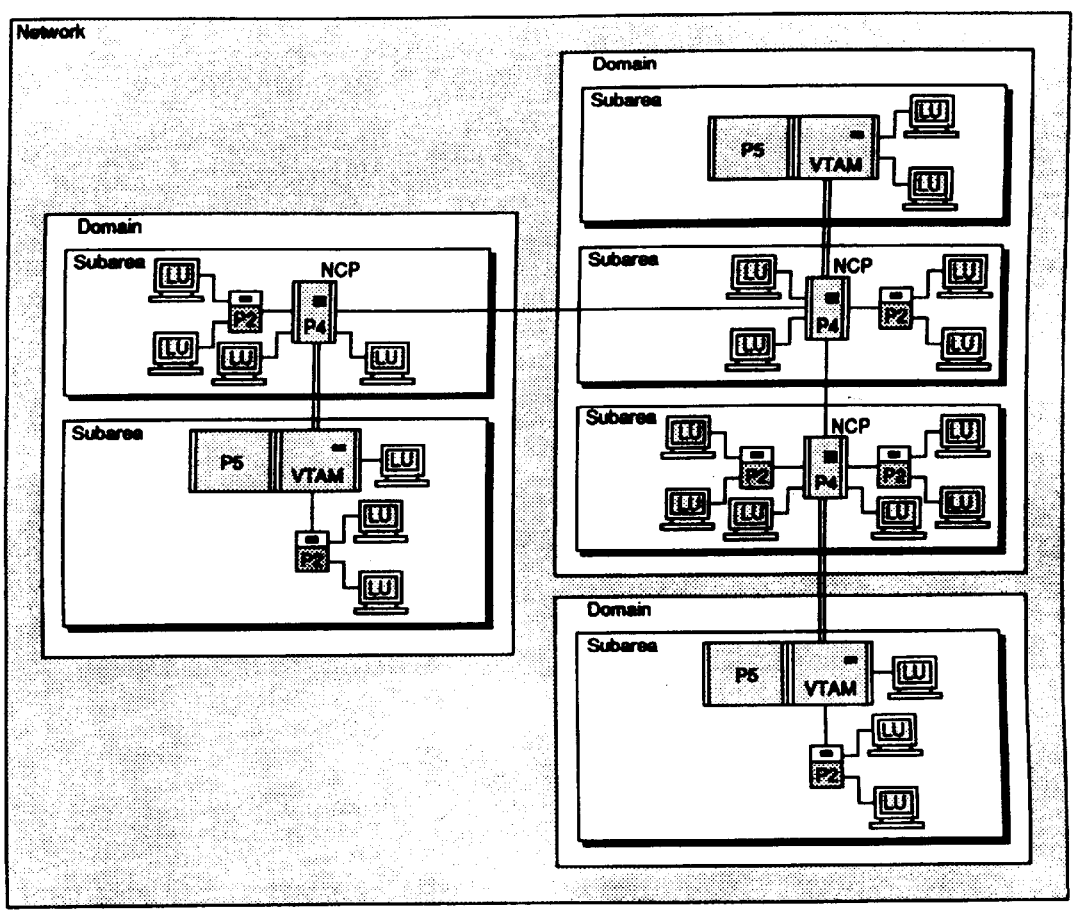
FIG. 1 is a block diagram illustrating the hierarchical structure of a SNA network.
Figure 2:
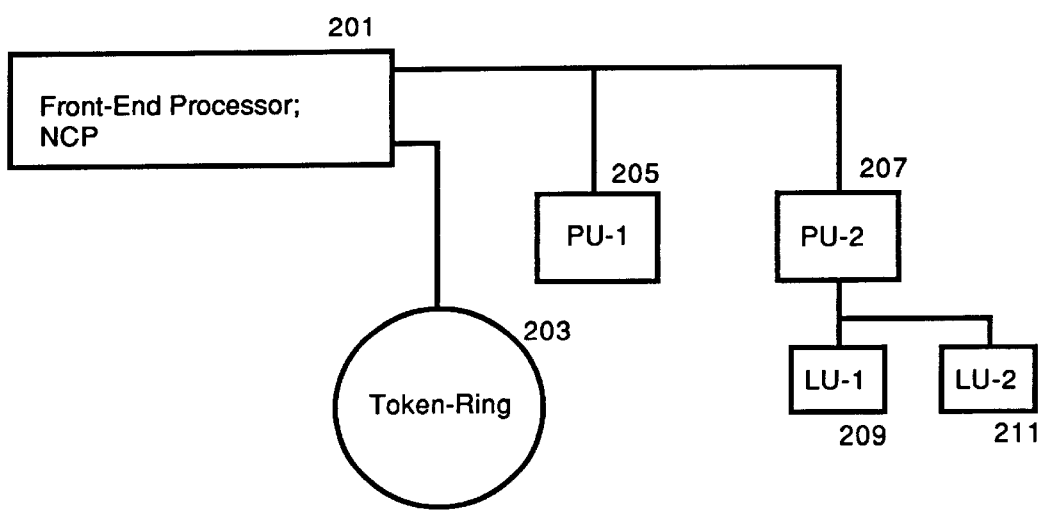
FIG. 2 is a block diagram of an example SNA network, as might be seen from a single front-end processor.
Figure 3:
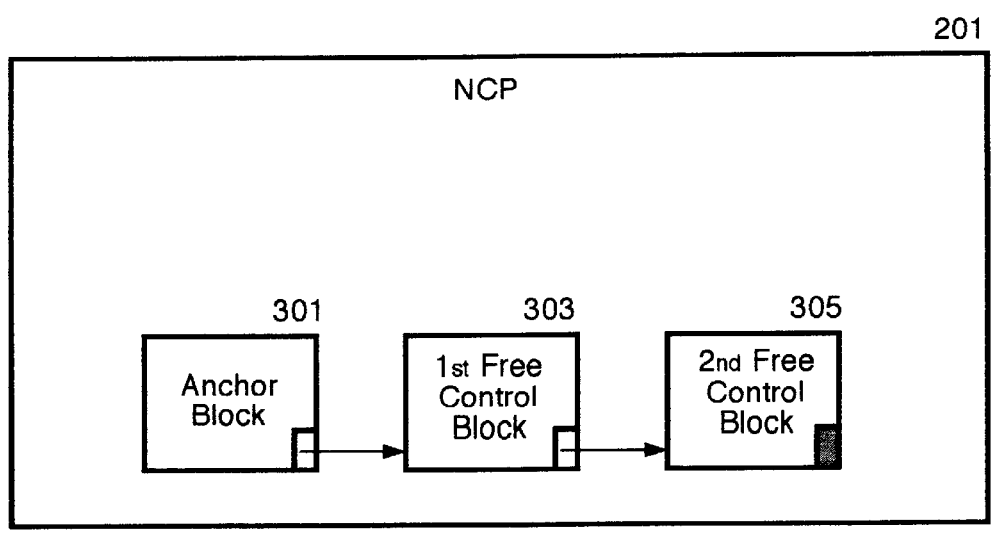
FIG. 3 is a block diagram of a NCP control block free chain; a list of free control block structures.
Figure 4:
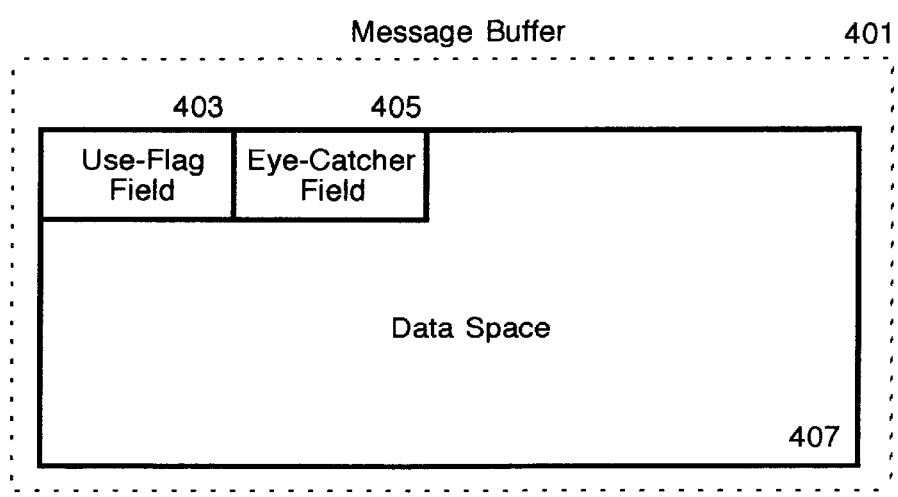
FIG. 4 is a single message buffer memory map.
Figure 5:
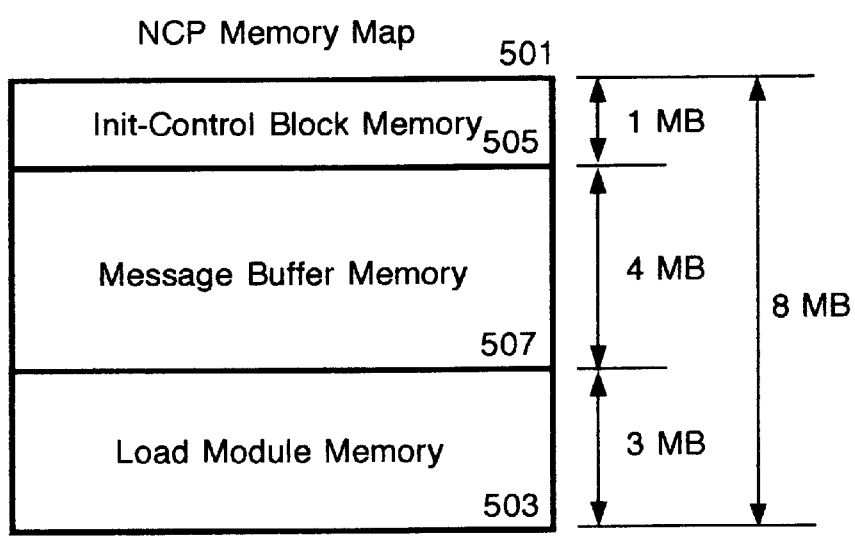
FIG. 5 is a NCP load module memory map.

For illustrative purposes assume that a NCP process is allocated 8 megabytes (MB) of random access memory (RAM) as shown in FIG. 5. Further, assume the NCP's load module 503 occupies 3 MB's of RAM. Within the load module proper is memory allocated for control block structures. Additional control blocks 505 may be defined at NCP initialization time according to IBM NCP specifications. Say 1 MB of RAM is used for this purpose. This leaves a total of 4 MB RAM for use as message buffers 507.

Buffer pool memory 507 is logically broken into memory blocks of fixed length. The size of these blocks may vary from system to system or time to time but, once chosen by the NCP manager at initialization time, are fixed. The message buffers are used within the NCP process to pass messages (data) between two processes. As previously described, message buffers 507 are organized into a chain of free buffers, each with a use-flag and eye-catcher field.

NEWPROG advantageously permits a user (e.g., human network administrator or an automatic network administrator program) to allocate dynamically control block structures by acquiring message buffer memory, formatting it to look like a specified (arbitrary) NCP control block, and passing the newly created control block to the NCP for its use. NEWPROG can also delete any control block structure it creates.

The process of acquiring message buffer memory for use as control block memory is called "leasing." Leasing involves 1) removing the targeted message buffers from the message buffer pool's free chain, 2) adjusting any counters within the message buffer pool accounting mechanism as needed, e.g., decrement the count of available buffers for each buffer leased, and 3) adjusting any counters within the NCP accounting mechanism as needed, e.g., increment the count of available control blocks of the type just created.

Figure 6:
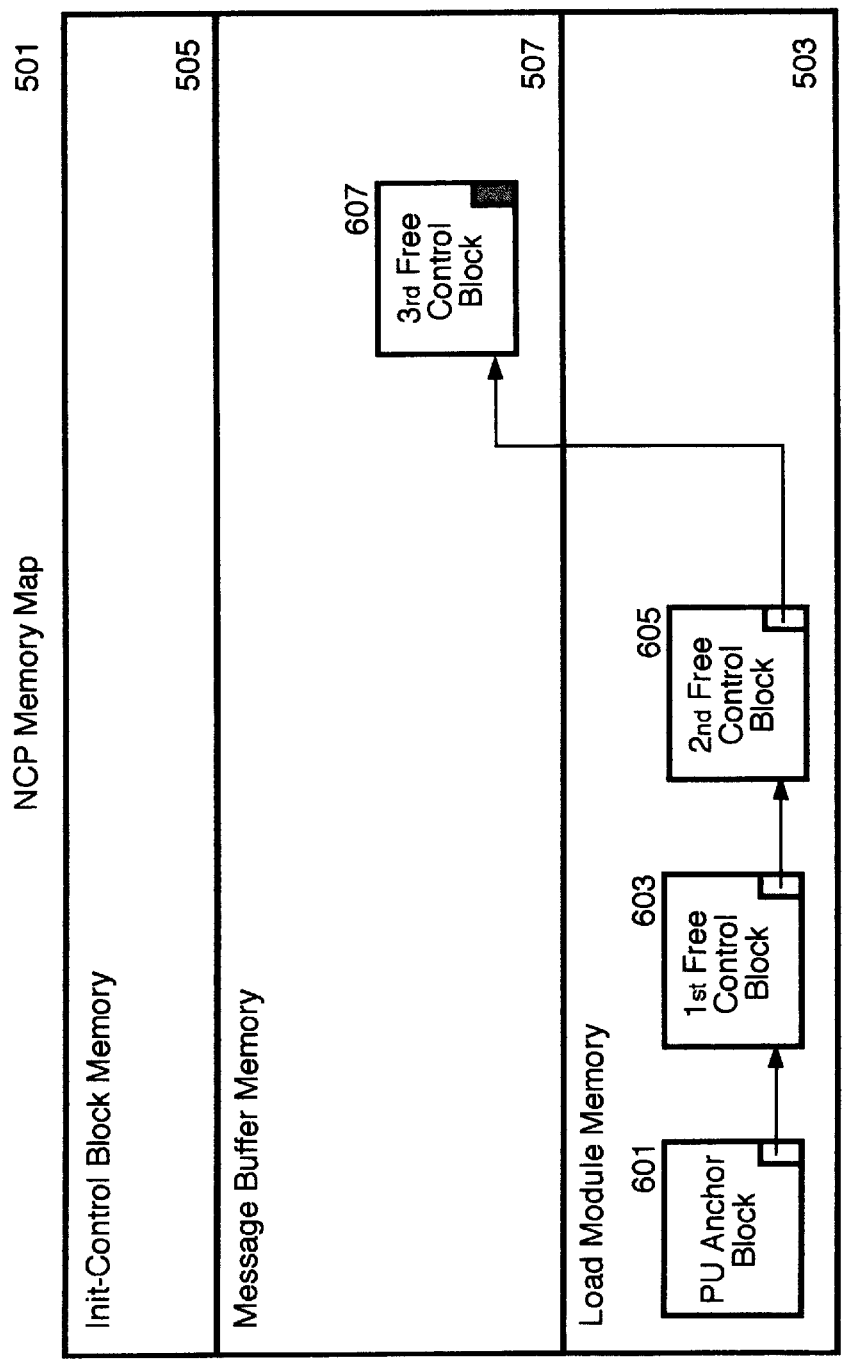
FIG. 6 is a NCP load module memory map depicting where NEWPROG places dynamically created control block memory structures.

Assume a new control block of type PU is to be created as in FIG. 6. Initially the NCP has reference 601 to only two free control blocks of type PU, 603 and 605. After leasing the necessary memory from the message buffer pool and formatting it in accordance with NCP specifications for a control block of type PU, NEWPROG links the new control block 607 into the NCP's free chain. The NCP now has 3 free control blocks of type PU.

4.2 Add Control Block Operation: Single Buffer

For a more detailed discussion, assume a new control block of type PU is to be created and further, that the memory requirements for the control block fit within the memory allocated to a single message buffer.

Figure 7:
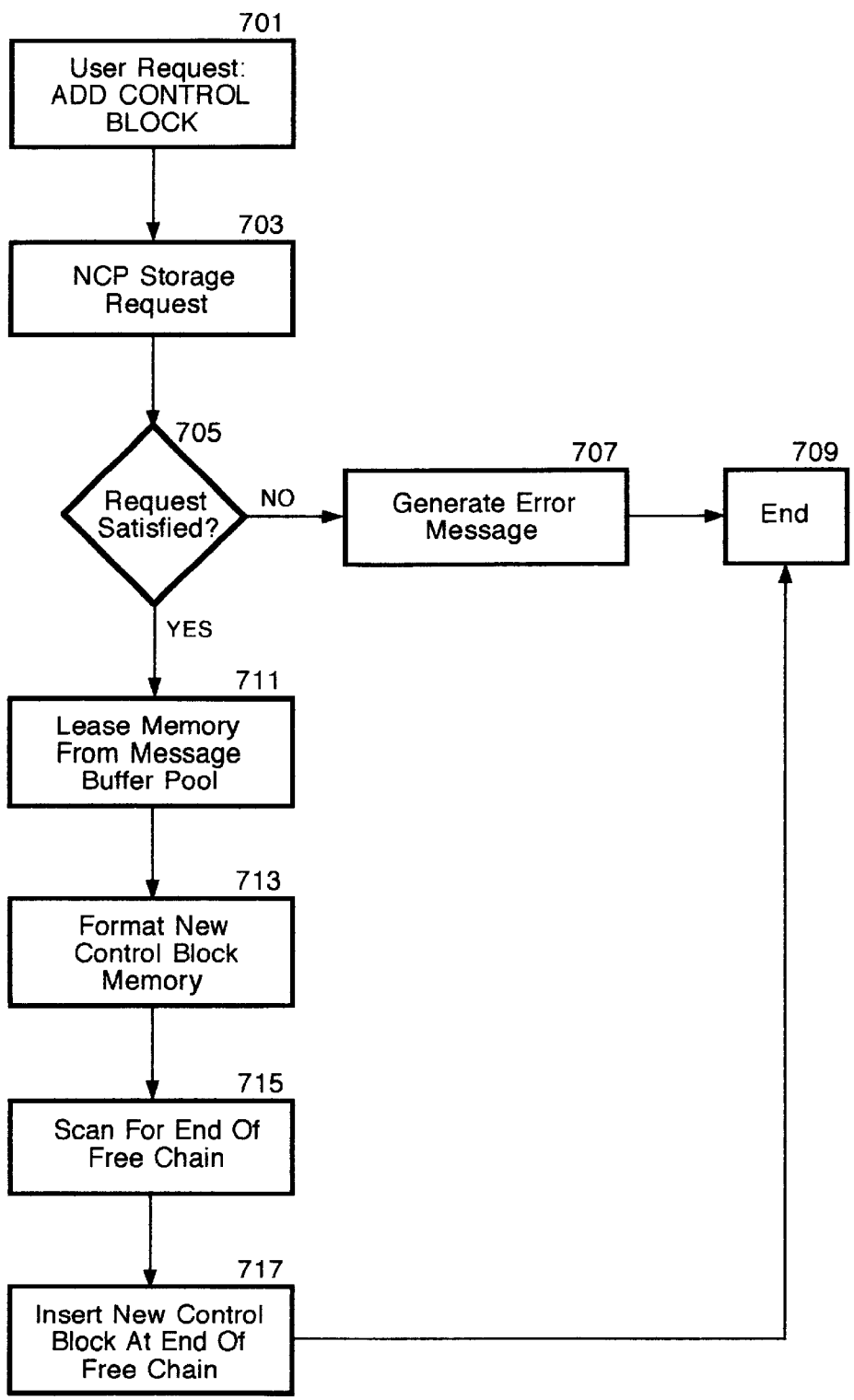
FIG. 7 is a data-flow diagram depicting how NEWPROG dynamically creates a new control block structure when the control block requires a single message buffer worth of memory.

FIG. 7 shows a flow diagram of the ADD CONTROL BLOCK operation. First, the user (NCP manager) requests an additional control block be created 701. Request 701 originates in the host system NEWPROG which issues a storage request to the NCP 703. At this time all interrupts to the NCP processor are disabled so that the memory operation can run to completion without interference.

If the storage request is not satisfied because there is no message buffer memory available, error message 707 is displayed to the user, NCP interrupts are reinstated and the operation terminates 709.

If the storage request is satisfied (i.e. the message buffer pool has at least one free buffer), the memory is leased from the message buffer pool 711 and formatted according to the NCP specification for a control block of type PU, 713. NEWPROG then scans for the end of the NCP's PU control block's free chain 715. Once found, the new control block is inserted at the end of the NCP's PU control block free chain 717. This process is repeated for each ADD CONTROL BLOCK request.

4.3 Add Control Block Operation: Multi-Buffer

As long as the control block being added is small enough to fit within a single message buffer NEWPROG can use standard NCP mechanisms for storage management (e.g., acquiring a single message buffer or updating message buffer and control block free chains). When a control block is larger than a single message buffer however, special care must be taken to ensure that sufficient, contiguous, message buffer memory is available for the operation; NCP is capable of manipulating contiguous memory control blocks only. It has no means of using a control block which is broken into pieces and logically linked together.

Figure 8:
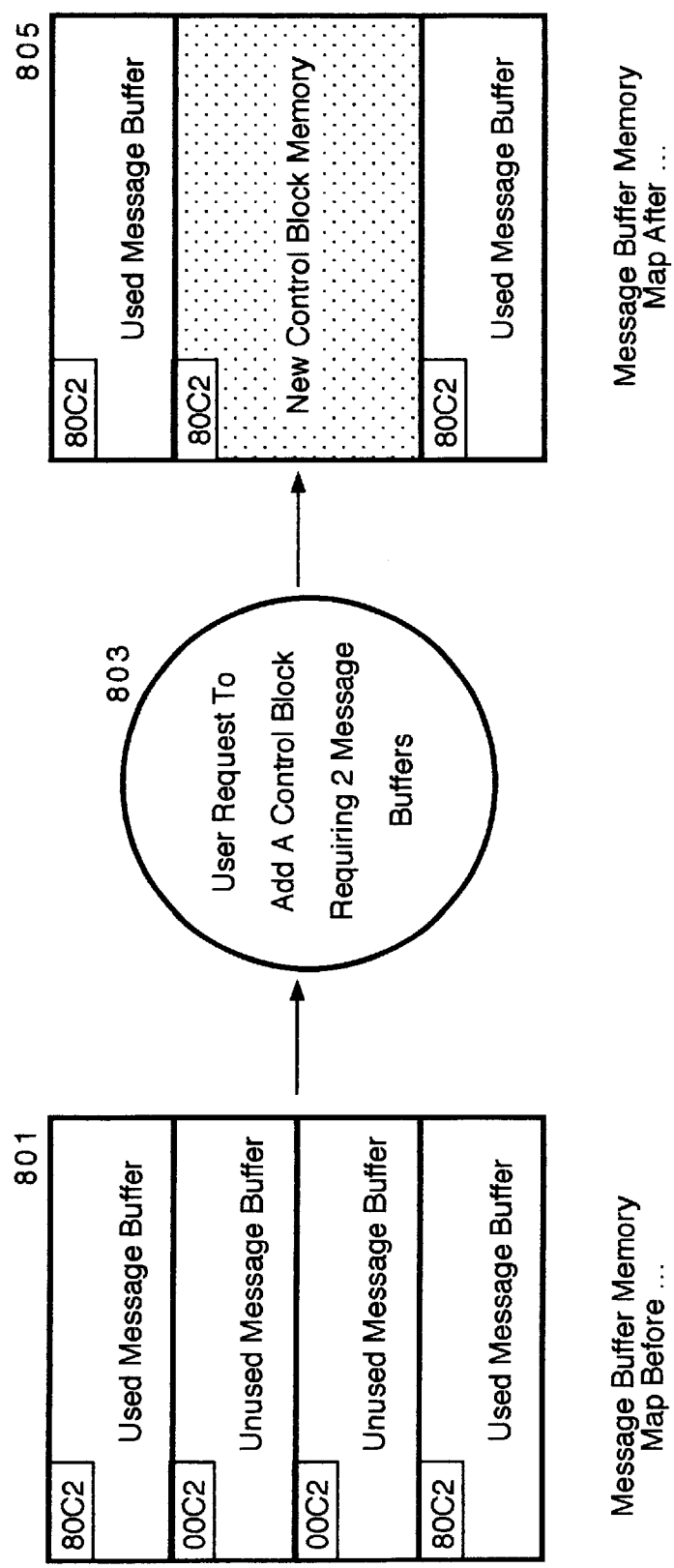
FIG. 8 depicts an example message buffer memory state before, and after, an ADD CONTROL BLOCK operation when the newly created control block requires two message buffer's worth of memory.

FIG. 8 shows an example message buffer memory map before (801) and after (805) an ADD CONTROL BLOCK operation (803) needing two contiguous message buffers. Because of internal IBM NCP processing requirements, NEWPROG sets the use flag and eye-catcher of the first message buffer to 00 and C2 respectively. The remaining memory (of the two message buffers) is then available for use as a control block. A significant point is that contiguous memory is needed when a new control block is being instantiated.

Figure 9:
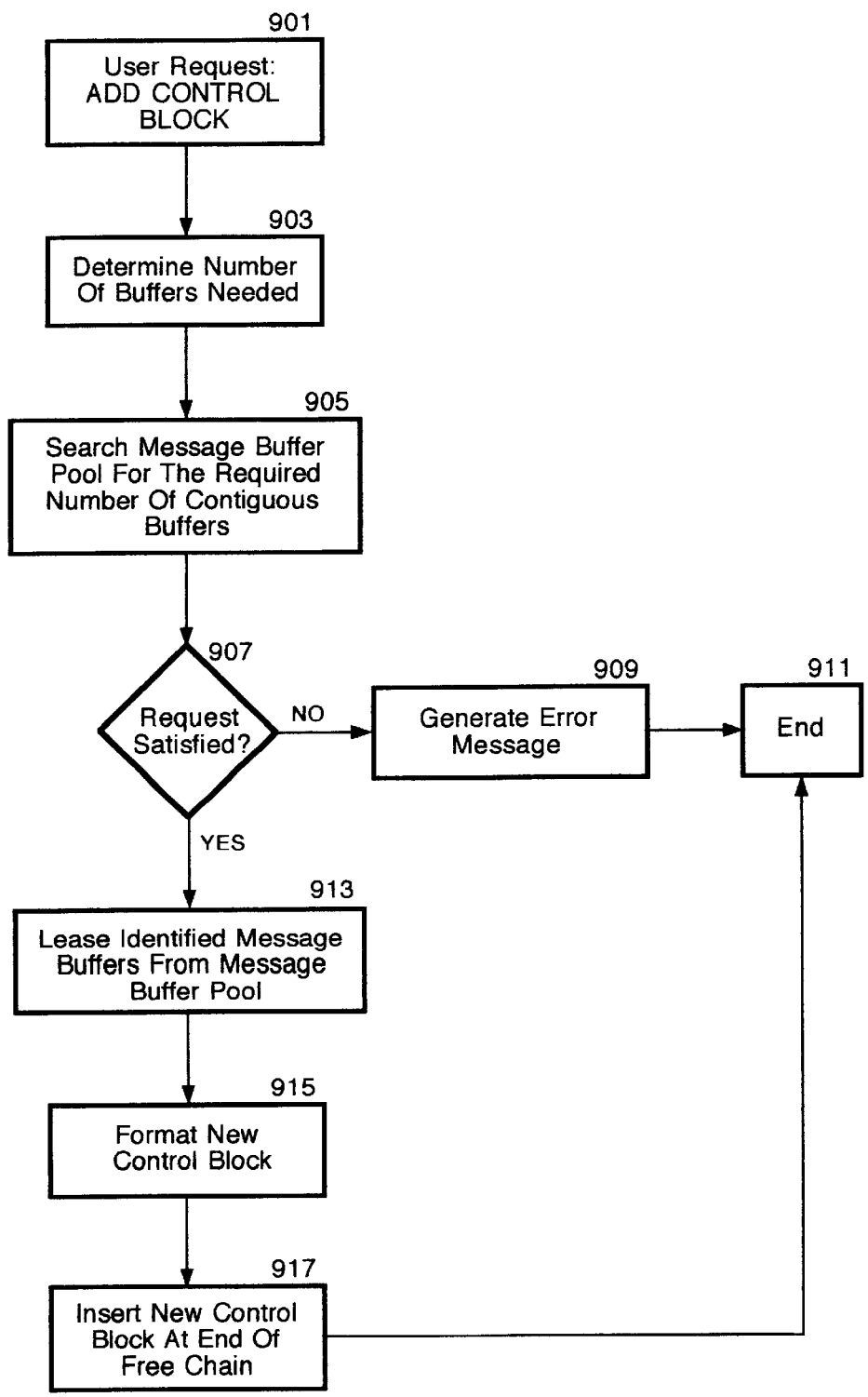
FIG. 9 is a data-flow diagram depicting how NEWPROG dynamically creates a new control block structure when the control block requires more than a single message buffer worth of memory.

A procedure for adding multiple message buffer control blocks is outlined in FIG. 9. First, the user (NCP manager) requests an additional control block be created 901. NEWPROG then determines the minimum number of whole message buffers needed for the requested control block, 903. At this time all interrupts to the NCP processor are disabled so that the memory operation can run to completion without interference.

Next, NEWPROG searches the message buffer's free chain until the necessary number of contiguous message buffers are found, 905. If there are insufficient contiguous free message buffers, an error message 909 is generated and the process is terminated 911.

If the storage request is satisfied the identified message buffers are leased from the message buffer pool 913 and formatted according to the NCP specification for the targeted control block 915. Finally, the new control block is inserted at the end of the appropriate NCP free chain 917. This process is repeated for each multiple message buffer ADD CONTROL BLOCK request.

4.4 Delete Control Block Operation: Single Buffer

Figure 10:
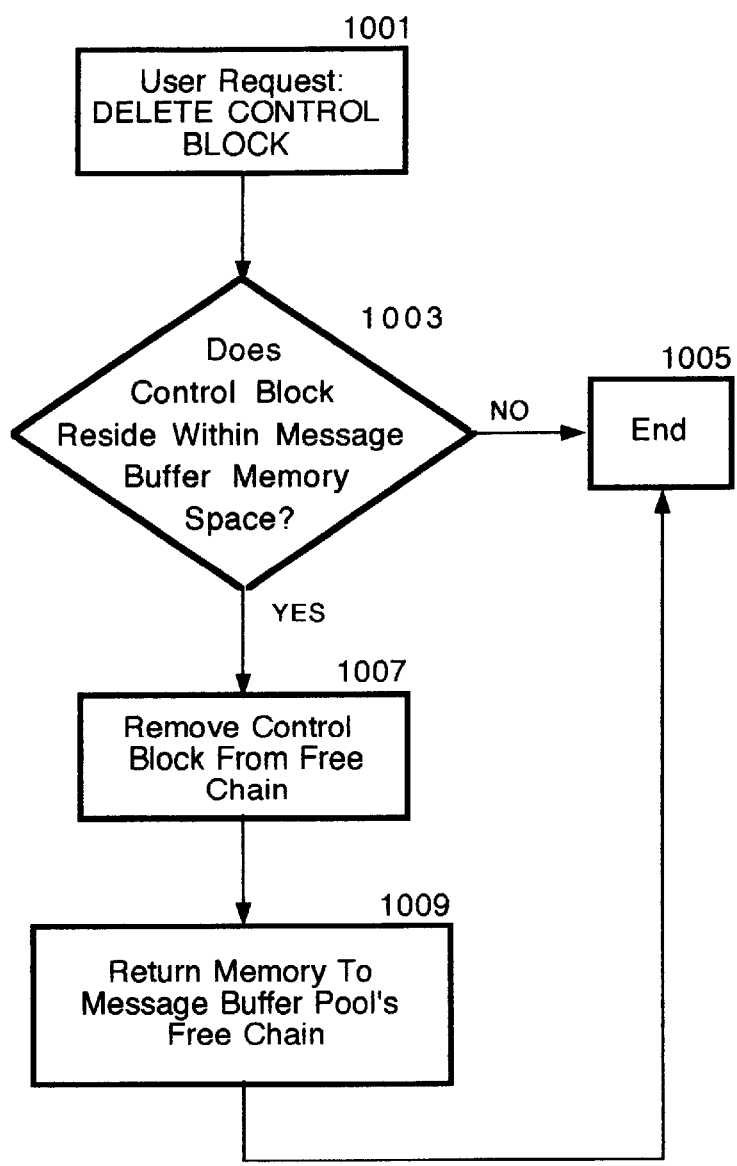
FIG. 10 is a data-flow diagram depicting how NEWPROG destroys a previously created control block structure when the control block required a single message buffer worth of memory.

The DELETE CONTROL BLOCK operation for a single message buffer control block is shown in FIG. 10. First, the user (NCP manager) requests that a control block be deleted at box 1001. At this time all interrupts to the NCP processor are disabled so that the memory operation can run to completion without interference.

Next, NEWPROG looks to see if the control block to be deleted resides within the message buffer memory pool area, at box 1003. If it does not, the delete operation terminates at box 1005. NEWPROG does not delete any control blocks that it did not first create i.e., that were not carved out of the message buffer memory pool. This is not an implementation restriction, rather a matter of practicality. Current IBM NCP implementations are not capable of using load module memory or init-control block memory for message buffers. Therefore, deleting a control block that is a part of these (load module or init-control block) areas would provide no benefit to NCP operations.

If the target control block does reside within the message buffer memory space then NEWPROG originally created it and can, therefore, delete it. The control block is removed from the appropriate NCP control block free chain 1007 and returned to the message buffer pool's free chain 1009. This process is repeated for each control block that is to be deleted.

4.5 Delete Control Block: Multi-Buffer

Figure 11:
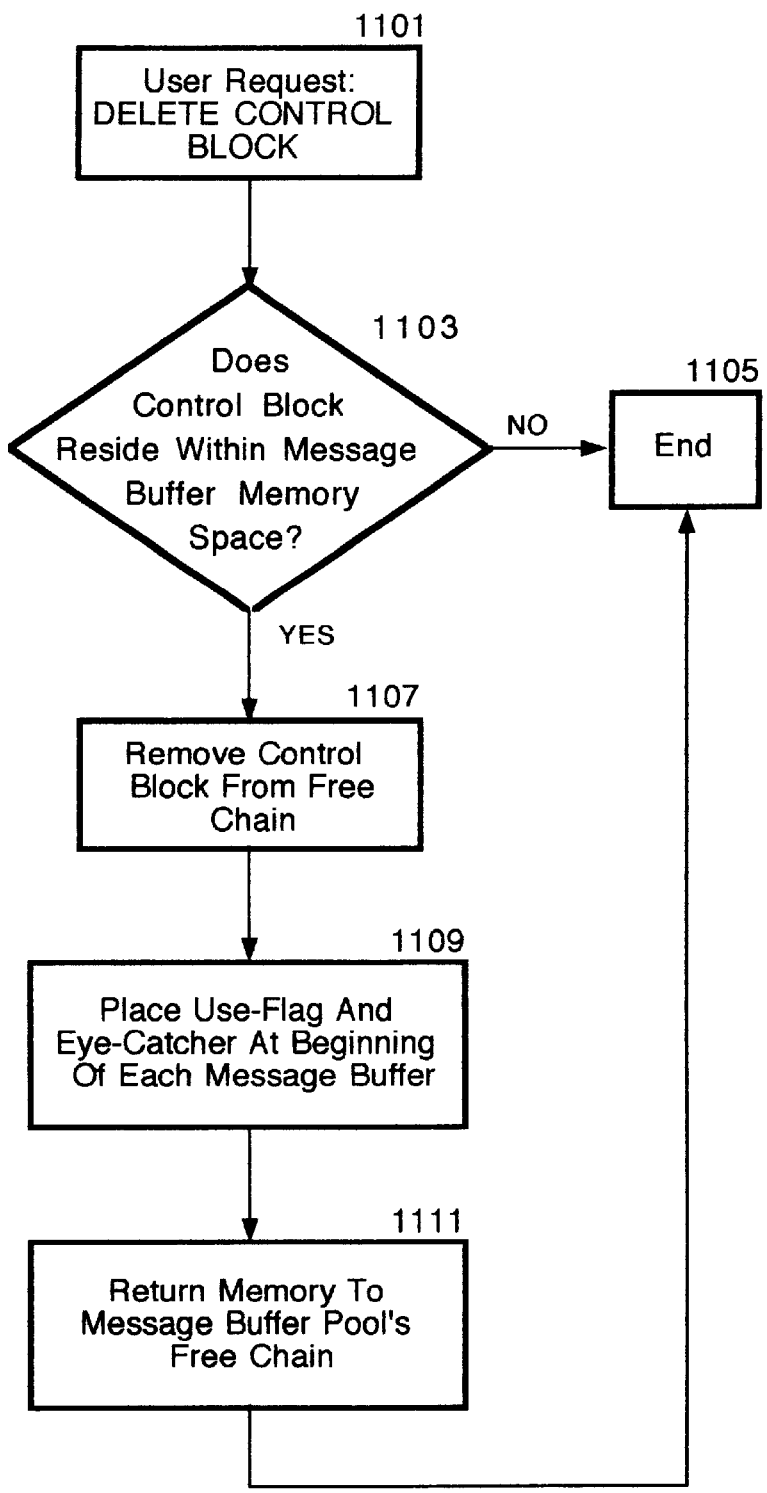
FIG. 11 is a data-flow diagram depicting how NEWPROG destroys a previously created control block structure when the control block required more than a single message buffer worth of memory.

The DELETE CONTROL BLOCK operation for a multiple message buffer control block is shown in FIG. 11. First, the user (NCP manager) requests that a control block be deleted at box 1101. At this time all interrupts to the NCP processor are disabled so that the memory operation can run to completion without interference.

Next, NEWPROG looks to see if the control block to be deleted resides within the message buffer memory pool area, at box 1103. If it does not, the delete operation terminates at box 1105. As previously discussed, NEWPROG does not delete any control blocks that it did not first create.

If the target control block does reside within the message buffer memory space then it is removed from the appropriate NCP control block free chain at box 1107 and the use flag 80 (hexadecimal) and eye-catcher C2 (hexadecimal) are placed at the beginning of all buffers used in the multiple buffer control block at box 1109.

Finally, NEWPROG calls upon NCP memory release procedures to return the message buffers to the message buffer memory pool's free chain at box 1111. This process is repeated for each multiple buffer control block that is to be deleted.

It will be appreciated by those of ordinary skill having the benefit of this disclosure that numerous variations from the foregoing illustration will be possible without departing from the inventive concept described herein. For example, automating the control block addition and deletion process is a natural extension. Similarly, the method of dynamically creating and deleting control blocks may also be applied to other NCP data structures such as the Resource Vector Table.

Accordingly, it is the claims set forth below, and not merely the foregoing illustration, which are intended to define the exclusive rights claimed in this application.

07 08 93

APPENDIX

DYNATUNE STORAGE MANAGER                                                                                    PAGE   23

LOC  OBJ CODE    R1N1M R2N2 ADDR    STMT   SOURCE STATEMENT                              CWAX V3R2 04.34 06/10/93

```
                                   4069+*, CCBWRPC  DEFMSK  3  UACB/ACB COMPATIBLE
                                   4074+*, CCBTATD  DEFMSK  4  TA/TD AND AIT INDEX COMPATIBLE
                                   4080+*, CCBACHN  DEFMSK  4  LPDA1 - CHANNEL A TEST
                                   4085+*, CCBDISR  DEFMSK  4  LPDA2 - DISRUPTIVE TEST
                                   4095+*, CCBLCTL  DEFMSK  6  LINE CONTROL DEFINITION
                                   4123+*, CCBCTYP  DEFMSK  0  REQUEST TYPE BIT DEFINITION
                                   4128+*, CCBCHNC  DEFMSK  1  CRB CHAIN BIT DEFINITION
                                   4133+*, CCBSRNR  DEFMSK  2  POLL TYPE DEFINITION
                                   4138+*, CCBFDXP  DEFMSK  3  FDX POLL DEFINITION
                                   4143+*, CCBRNRS  DEFMSK  4  RNR EXCEPT BIT DEFINITION
                                   4148+*, CCBCSAT  DEFMSK  5  COMMIT SATISFIED BIT DEF
                                   4153+*, CCBCPRG  DEFMSK  6  COMMIT IN PROGRESS BIT DEF
                                   4158+*, CCBADEC  DEFMSK  7  ALL DECOMMIT BIT DEFINITION
                                   4433+*, AXBNMDE  DEFMSK  6  SET/RESET NORMAL MODE MASK
                                   4501+*, AXBSMSN  DEFMSK  0  MODE BIT 3725 OR 3720-0TH SPEED BIT ALLO
                                   4507+*, AXBSMEC  DEFMSK  5  1 = EXTERNAL CLOCKING
                                   4510+*, AXBSMDS  DEFMSK  6  DATA RATE SELECT (1=HI)
                                   4513+*, AXBLCL   DEFMSK  7  LOCAL ATTACH-NO MODEM
                                   4541+*, AXBX21L  DEFMSK  0  X.21 LEASED
                                   4544+*, AXBLNSP  DEFMSK  1  HIGH SPEED LINE
                                   6347+           PRINT GEN                                              00520000
000000                             6348+DYTSTMGR   CSECT                                                  00530000
                                   6349+           ENTRY DYTSTMGR                                         00540000
000000 A808                 0000A  6350+           B      NRMSTRT                 SKIP EYECATCHER        00550000
                                   6351+*                                                                 00560000
000002 C4E8E3E2E3D4C7D9            6352+           DC     CL8'DYTSTMGR'           EYECATCHER             00570000
                                   6353+*                                                                 00580000
                            0000A  6354+NRMSTRT    EQU    *                                               00590000
                                   6355             $USING 'RETURN ADDRESS',R1                            00470001
                                   6356             $USING 'SAVE AREA POINTER',R6                         00480001
                                   6357 *                                                                 00490001
                                   6358             SAVE   (1,7,INCL),RA=(1),AREA=YES                     00500001
00000A 618A       1    6           6359+            ST     (1),8(6)              SAVE RETURN ADDRESS     @NM03644  51600000
00000C 618E       1    6           6360+            ST     1,12(6)                           SAVE A REG            46000000
00000E 6292       2    6           6361+            ST     2,16(6)                           SAVE A REG            61000000
000010 6396       3    6           6362+            ST     3,20(6)                           SAVE A REG            61000000
000012 649A       4    6           6363+            ST     4,24(6)                           SAVE A REG            61000000
000014 659E       5    6           6364+            ST     5,28(6)                           SAVE A REG            61000000
000016 67A2       7    6           6365+            ST     7,32(6)                     SAVE REGISTER 7             57600000
000018 6606       6    6           6366+            L      6,4(6)                      POINT TO NEXT SAVEAREA      70600000
                                   6367             $DROP R1                                              00510001
                                   6368             $USING ANCLEVEL,R4                                    00520001
                            00000  6369+            USING ANCLEVEL,R4                                     00340002
                                   6370             EXTRN NRMANCHX                                        00530001
                                   6371             LA     R2,NRMANCHX                                    00540001
                                   6372+*,          LA     R2,NRMANCHX . INSTRUCTION AS CODED .
00001A                             6373+            DS     0H . LA INSTRUCTION MACRO .                    08950000
00001A 00000000                    6374+            DC     AL4(NRMANCHX) . LAST 3 BYTES OF LA .           09000000
00001E                      0001A  6375+            ORG    *-4                                            09050000
00001A BA                          6376+            DC     AL1(184+R2) . 1ST BYTE OF LA .                 09100000
00001B                      0001E  6377+            ORG    *+3                                            09150000
                                   6378             $USING NRMANCH,R2                                     00550001
                            00000  6379+            USING NRMANCH,R2                                      00340002
```

07 08 93

DYNATUNE STORAGE MANAGER                                                                PAGE   24

LOC  OBJ CODE  R1N1M R2N2 ADDR    STMT   SOURCE STATEMENT                CWAX V3R2 04.34 06/10/93

6381 *                                                          00570001
                                      6382 **********************************************************  00580001
                                      6383 ***                                                ***  00590001
                                      6384 ***          SEE WHICH TYPE OF CALL               ***  00600001
                                      6385 ***                                                ***  00610001
                                      6386 **********************************************************  00620001
                                      6387 *                                                          00630001
    00001E 4F6A    7(1)  4  0006A     6388        IC    R7L0,DSTMCALL    LOAD THE CALL TYPE           00640001
    000020 F780    7(1)     00080     6389        TRM   R7L0,DSTMACQ     IF ACQUIRE                   00650001
    000022 9806             0002A     6390        BCL   STMACQRE         SKIP                         00660001
    000024 F740    7(1)     00040     6391        TRM   R7L0,DSTMREL     IF RELEASE                   00670001
    000026 98B6             000DE     6392        BCL   STMRELSE         SKIP                         00680001
    000028 A906             00130     6393        B     STMGEXIT         SKIP                         00690001
                                      6394 *                                                          00700001
                                      6395 **********************************************************  00710001
                                      6396 ***                                                ***  00720001
                                      6397 ***           ACQUIRE A BLOCK OF STORAGE           ***  00730001
                                      6398 ***                                                ***  00740001
                                      6399 **********************************************************  00750001
                                      6400 *                                                          00760001
    00002A                            6401 STMACQRE DS   0H                                           00770001
                                      6402 *                                                          00780001
                                      6403 *  CONVERT THE LENGTH INTO # OF BUFFERS                    00790001
                                      6404 *                                                          00800001
    00002A 4772    7     4  00070     6405        L     R7,DSTMLEN       LOAD LENGTH                  00810001
                                      6406        $USING 'ACQUIRE LENGTH',R7                          00820001
    00002C 9704    7(1)     00004     6407        ARI   R7L0,4           ADD 4 FOR HEADER INFO        00830001
    00002E 55A8    5     5            6408        SR    R5,R5            CLEAR OTHER WORK REG         00840001
    000030 2D5E    5(1)  2  0005E     6409        IC    R5L0,ANCBUFLN    LOAD BUFFER LENGTH           00850001
                                      6410        $USING 'BUFFER LENGTH',R5                           00860001
    000032 11A8    1     1            6411        SR    R1,R1            CLEAR LOOP COUNTER           00870001
                                      6412        $USING 'BUFFER COUNT',R1                            00880001
    000034                            6413 STMLENLP DS   0H                                           00890001
    000034 9101    1(1)     00001     6414        ARI   R1L0,1           ADD 1 TO BUFFER COUNTER      00900001
    000036 57A8    7     5            6415        SR    R7,R5            DEDUCT BUFFER LENGTH         00910001
    000038 8804             0003E     6416        BZL   STMLENEX         SKIP IF ZERO                 00920001
    00003A 9802             0003E     6417        BCL   STMLENEX         DITTO                        00930001
    00003C A80B             00034     6418        B     STMLENLP         SKIP                         00940001
    00003E                            6419 STMLENEX DS   0H                                           00950001
    00003E 41F2    1     4  00070     6420        ST    R1,DSTMLEN       SAVE BUFFER COUNT            00960001
                                      6421        $DROP R1,R5,R7                                      00970001
    000040 40F6    0     4  00074     6422        STZ   DSTMNMUS         SAVE IT                      00980001
                                      6423 *                                                          00990001
                                      6424 *  START WITH THE FIRST BUFFER IN THE FREE POOL            01000001
                                      6425 *                                                          01010001
    000042 236A    3     2  00068     6426        L     R3,ANCXDAP       POINT TO XDA                 01020001
                                      6427        $USING XXCXTXDA,R3                                  01030001
                              00000   6428+       USING XXCXTXDA,R3                                   00340002
    000044 0356    3     0  00054     6429        L     R3,SYSBUFPL      LOAD 1ST BUFFER              01040001
                                      6430        $DROP R3                                            01050001
                                      6431+       DROP  R3                                            00190002
                                      6432        $USING PIU4,R3                                      01060001
                              00000   6433+       USING PIU4,R3                                       00340002
    000046                            6434 ACQSCNLP DS   0H                                           01070001
    000046 216A    1     2  00068     6435        L     R1,ANCXDAP       POINT TO XDA                 01080001

07 08 93

DYNATUNE STORAGE MANAGER                                                        PAGE   25

LOC   OBJ CODE  R1N1M R2N2 ADDR   STMT  SOURCE STATEMENT                    CWAX V3R2 04.34 06/10/93

6436        $USING XXCXTXDA,R1                               01090001
                                00000 6437+        USING XXCXTXDA,R1                               00340002
    000048 1152        1     1  00050 6438        L      R1,SYSW4          LOAD LAST BUFFER        01100001
    00004A 3188        1     3        6439        CR     R1,R3             IF THE SAME ONE         01110001
    00004C 8882                 000D0 6440        BE     ACQRMVEX          SKIP                    01120001
                                      6441        $DROP  R1                                        01130001
                                      6442+       DROP   R1                                        00190002
                                      6443 *                                                       01140001
    00004E 77A8        7     7        6444        SR     R7,R7             CLEAR WORK REG          01150001
    000050 2F5E       7(1)   2  0005E 6445        IC     R7LO,ANCBUFLN     LOAD BUFFER LENGTH      01160001
    000052 7398        3     7        6446        AR     R3,R7             POINT TO NEXT BUFFER    01170001
    000054 A304       3(1)      00004 6447        SRI    R3LO,4            BACK UP TO HEADER       01180001
    000056 3F00       7(1)   3        6448        IC     R7LO,0(R3)        LOAD BUFFER FLAG        01190001
    000058 F780       7(1)      00080 6449        TRM    R7LO,X'80'        IF NOT ALLOCATED        01200001
    00005A 8806                 00062 6450        BZL    ACQSCNFN          SKIP                    01210001
    00005C                             6451 ACQSCNNE DS  OH                                        01220001
    00005C 9304       3(1)      00004 6452        ARI    R3LO,4            MOVE IT BACK UP         01230001
    00005E 40F6        0     4  00074 6453        STZ    DSTMNMUS          SAVE IT                 01240001
    000060 A81D                 00046 6454        B      ACQSCNLP          LOOK FOR ANOTHER ONE    01250001
                                      6455 *                                                       01260001
                                      6456 * FREE BUFFER FOUND - SEE IF WE HAVE ENOUGH             01270001
                                      6457 *                                                       01280001
    000062                             6458 ACQSCNFN DS  OH                                        01290001
    000062 3F01       7(1)   3        6459        IC     R7LO,1(R3)        LOAD BUFFER CONSTANT    01300001
    000064 B7C2       7(1)      000C2 6460        CRI    R7LO,X'C2'        IF NOT EYECATCHER       01310001
                                      6461        BNE    ACQSCNNE          SKIP                    01320001
    000066 8802                 0006A 6462+       BZL    *+4 SKIP NEXT INSTRUCTION IF EQUAL        39000001
    000068 A80F                 0005C 6463+       B      ACQSCNNE BRANCH IF NOT EQUAL              45000000
                                      6464 *                                                       01330001
    00006A 9304       3(1)      00004 6465        ARI    R3LO,4            BACK TO THE FRONT       01340001
    00006C 4776        7     4  00074 6466        L      R7,DSTMNMUS       LOAD USED COUNT         01350001
    00006E 9802                 00072 6467        BCL    ACQSCNSF          SKIP                    01360001
    000070 43EE        3     4  0006C 6468        ST     R3,DSTMFSBF       SAVE FIRST BUFFER       01370001
    000072                             6469 ACQSCNSF DS  OH                                        01380001
    000072 9701       7(1)      00001 6470        ARI    R7LO,1            ADD 1 TO IT             01390001
    000074 47F6        7     4  00074 6471        ST     R7,DSTMNMUS       SAVE IT                 01400001
    000076 4572        5     4  00070 6472        L      R5,DSTMLEN        LOAD NUMBER TO GET      01410001
    000078 57B8        7     5        6473        CR     R7,R5             IF AT THE LIMIT         01420001
                                      6474        BNE    ACQSCNLP          SKIP                    01430001
    00007A 8802                 0007E 6475+       BZL    *+4 SKIP NEXT INSTRUCTION IF EQUAL        39000001
    00007C A839                 00046 6476+       B      ACQSCNLP BRANCH IF NOT EQUAL              45000000
                                      6477        $DROP  R3                                        01440001
                                      6478+       DROP   R3                                        00190002
                                      6479 *                                                       01450001
                                      6480 * ENOUGH FREE CONTIGUOUS BUFFERS FOUND - NOW REMOVE THEM 01460001
                                      6481 * FROM THE FREE BUFFER POOL.                            01470001
                                      6482 *                                                       01480001
    00007E 456E        5     4  0006C 6483        L      R5,DSTMFSBF       LOAD FIRST BUFFER       01490001
                                      6484        $USING 'BUFFER POINTER',R5                       01500001
    000080 40F6        0     4  00074 6485        STZ    DSTMNMUS          CLEAR NUMBER USED       01510001
    000082                             6486 ACQRMVST DS  OH                                        01520001
    000082 276A        7     2  00068 6487        L      R7,ANCXDAP        POINT TO XDA            01530001
                                      6488        $USING XXCXTXDA,R7                               01540001
                                00000 6489+       USING  XXCXTXDA,R7                               00340002
    000084 0346        3     0  00044 6490        L      R3,SYSBP1FB       LOAD 1ST FREE BUFF.     01550001

07 08 93

DYNATUNE STORAGE MANAGER                                                                      PAGE   26

LOC   OBJ CODE   R1N1M R2N2 ADDR   STMT   SOURCE STATEMENT                          CWAX V3R2 04.34 06/10/93

6491          $USING PIU4,R3                                       01560001
                                  00000  6492+         USING  PIU4,R3                                       00340002
   000086 9744           7(1)     00044  6493          ARI    R7L0,(SYSW1-XXCXTXDA)   POSITION POINTER      01570001
                                         6494          $DROP  R7                                            01580001
                                         6495+         DROP   R7                                            00190002
                                         6496 ACQRMVCK DS     0H                                            01590001
   000088                                6497          $USING 'PREV BUFFER',R7                              01600001
   000088 35B8          5     3          6498          CR     R5,R3                   IF THIS IS IT         01610001
   00008A 8808                    00094  6499          BE     ACQRMVFN               SKIP                   01620001
                                         6500 *                                                             01630001
   00008C 3788          7     3          6501          LR     R7,R3                   SAVE POINTER          01640001
   00008E 3302          3     3   00000  6502          L      R3,U4BUFCHN             POINT TO NEXT BUFFER  01650001
   000090 883E                    000D0  6503          BZL    ACQRMVEX                SKIP                  01660001
   000092 A80D                    00088  6504          B      ACQRMVCK                                      01670001
                                         6505 *                                                             01680001
   000094                                6506 ACQRMVFN DS     0H                                            01690001
   000094 3102          1     3   00000  6507          L      R1,U4BUFCHN             LOAD FORWARD POINTER  01700001
   000096 7182          1     7          6508          ST     R1,0(R7)                SAVE FWD POINTER      01710001
   000098 A304          3(1)       00004 6509          SRI    R3L0,4                  BACK UP 4 BYTES       01720001
   00009A 3081          0     3          6510          STHZ   0(R3)                   ZERO FIRST 2 BYTES    01730001
                                         6511          $DROP  R7                                            01740001
                                         6512 *                                                             01750001
                                         6513          $FLIP  R3,R5                                         01760001
                                         6514+         DROP   R3                                            00190002
                                  00000  6515+         USING  PIU4,R5                                       00340002
                                         6516          $DROP  R3                                            01770001
   00009C 236A          3     2   00068  6517          L      R3,ANCXDAP              LOAD XDA POINTER      01780001
                                         6518          $USING XXCXTXDA,R3                                   01790001
                                  00000  6519+         USING  XXCXTXDA,R3                                   00340002
   00009E 3146          1     3   00044  6520          L      R1,SYSW1                LOAD FIRST FREE BUFFER 01800001
   0000A0 5188          1     5          6521          CR     R1,R5                   IF THEY DONT MATCH    01810001
                                         6522          BNE    ACQRMVFF                SKIP                  01820001
   0000A2 8802                    000A6  6523+         BZL    *+4 SKIP NEXT INSTRUCTION IF EQUAL            39000001
   0000A4 A804                    000AA  6524+         B      ACQRMVFF BRANCH IF NOT EQUAL                 45000000
   0000A6 5102          1     5   00000  6525          L      R1,U4BUFCHN             LOAD FORWARD POINTER  01830001
   0000A8 31C6          1     3   00044  6526          ST     R1,SYSW1                SAVE IT               01840001
                                         6527 *                                                             01850001
   0000AA                                6528 ACQRMVFF DS     0H                                            01860001
   0000AA 3172          1     3   00070  6529          L      R1,SYSW12               LOAD LAST FREE BUFFER 01861003
   0000AC 5188          1     5          6530          CR     R1,R5                   IF THEY DONT MATCH    01862003
                                         6531          BNE    ACQRMVLF                SKIP                  01863003
   0000AE 8802                    00082  6532+         BZL    *+4 SKIP NEXT INSTRUCTION IF EQUAL            39000001
   0000B0 A802                    00084  6533+         B      ACQRMVLF BRANCH IF NOT EQUAL                 45000000
   0000B2 37F2          7     3   00070  6534          ST     R7,SYSW12               SAVE IT               01865003
                                         6535 *                                                             01866003
   0000B4                                6536 ACQRMVLF DS     0H                                            01867003
                                         6537 *        L      R1,SYSW4                LOAD LAST BUFFER IN POOL 01870002
                                         6538 *        CR     R1,R5                   IF NOT THE SAME       01880002
                                         6539 *        BNE    ACQRMVLB                SKIP                  01890002
                                         6540 *        SR     R7,R7                   CLEAR WORK REG        01900002
                                         6541 *        IC     R7L0,ANCBUFLN           LOAD BUFFER LENGTH    01910002
                                         6542 *        LR     R1,R5                   LOAD BUFFER POINTER   01920002
                                         6543 *        SR     R1,R5                   BACK UP TO PREV BUFFER 01930002
                                         6544 *        ST     R1,SYSW4                SAVE NEW LAST BUFFER  01940002
                                         6545 *                                                             01950001

ERNST      G:\BMCA:085                                                                              PAGE 20

```
                                                                                  07 08 93

DYNATUNE STORAGE MANAGER                                                            PAGE   27

LOC  OBJ CODE  R1N1M R2N2 ADDR   STMT   SOURCE STATEMENT                    CWAX V3R2 04.34 06/10/93

000084                           6546 ACQRMVLB DS   OH                                            01960001
                                        6547 *         L    R1,SYSW5        LOAD FIRST BUFFER IN POOL   01970002
                                        6548 *         CR   R1,R5           IF NOT THE SAME             01980002
                                        6549 *         BNE  ACQRMVFB        SKIP                        01990002
                                        6550 *         SR   R7,R7           CLEAR WORK REG              02000002
                                        6551 *         IC   R7L0,ANCBUFLN   LOAD BUFFER LENGTH          02010002
                                        6552 *         LR   R1,R5           LOAD BUFFER POINTER         02020002
                                        6553 *         AR   R1,R5           POINT TO NEXT BUFFER        02030002
                                        6554 *         ST   R1,SYSW5        SAVE NEW FIRST BUFFER       02040002
                                        6555          $DROP R3                                          02050001
                                        6556+         DROP  R3                                          00190002
       000084                           6557 ACQRMVFB DS   OH                                           02060001
                                        6558 *                                                          02070001
       000084 2766   7    2    00064    6559          L    R7,ANCXDHP       POINT TO XDH                02080001
                                        6560          $USING XXCXTXDH,R7                                02090001
                             00000      6561+         USING XXCXTXDH,R7                                 00340002
       000086 7355   3    7    00054    6562          LH   R3,SYSH1         LOAD FREE BUFFER COUNT      02100001
       000088 A301  3(1)        00001   6563          SRI  R3L0,1           TAKE AWAY ONE               02110001
       00008A 7305   3    7    00054    6564          STH  R3,SYSH1         SAVE IT BACK                02120001
                                        6565          $DROP R7                                          02130001
                                        6566+         DROP  R7                                          00190002
                                        6567 *                                                          02140001
       00008C 4776   7    4    00074    6568          L    R7,DSTMNMUS      LOAD NUMBER USED            02150001
       00008E 9701  7(1)        00001   6569          ARI  R7L0,1           ADD 1 TO IT                 02160001
       0000C0 47F6   7    4    00074    6570          ST   R7,DSTMNMUS      SAVE IT                     02170001
       0000C2 4172   1    4    00070    6571          L    R1,DSTMLEN       LOAD NUMBER TO GET          02180001
       0000C4 71B8   1    7             6572          CR   R1,R7            IF WE HAVE THE NUMBER       02190001
       0000C6 8808              000D0   6573          BE   ACQRMVEX         SKIP                        02200001
       0000C8 77A8   7    7             6574          SR   R7,R7            CLEAR WORK REG              02210001
       0000CA 2F5E  7(1)  2    0005E    6575          IC   R7L0,ANCBUFLN    LOAD BUFFER LENGTH          02220001
       0000CC 7598   5    7             6576          AR   R5,R7            POINT TO NEXT BUFFER        02230001
       0000CE A84F              00082   6577          B    ACQRMVST                                     02240001
       0000D0                           6578 ACQRMVEX DS   OH                                           02250001
       0000D0 436E   3    4    0006C    6579          L    R3,DSTMFSBF      LOAD FIRST BUFFER           02260001
       0000D2 A304  3(1)        00004   6580          SRI  R3L0,4           BACK UP TO HEADER           02270001
       0000D4 8180  1(1)        00080   6581          LRI  R1L0,X'80'       LOAD ALLOCATED FLAG         02280001
       0000D6 3980  1(1)  3             6582          STC  R1L0,0(R3)       SAVE IN BUFFER AREA         02290001
       0000D8 81C2  1(1)        000C2   6583          LRI  R1L0,X'C2'       LOAD BUFFER EYECATCHER      02300001
       0000DA 3981  1(1)  3             6584          STC  R1L0,1(R3)       SAVE IN BUFFER AREA         02310001
                                        6585          $DROP R3,R5                                       02320001
                                        6586+         DROP  R5                                          00190002
       0000DC A852              00130   6587          B    STMGEXIT                                     02330001
                                        6588 *                                                          02340001
                                        6589 ***************************************************       02350001
                                        6590 *****                                            *****     02360001
                                        6591 *****            RELEASE A BLOCK OF STORAGE      *****     02370001
                                        6592 *****                                            *****     02380001
                                        6593 ***************************************************       02390001
                                        6594 *                                                          02400001
       0000DE                           6595 STMRELSE DS   OH                                           02410001
                                        6596 *                                                          02420001
                                        6597 * CONVERT THE LENGTH INTO # OF BUFFERS                     02430001
                                        6598 *                                                          02440001
       0000DE 4772   7    4    00070    6599          L    R7,DSTMLEN       LOAD LENGTH                 02450001
                                        6600          $USING 'ACQUIRE LENGTH',R7                        02460001
```

07 08 93

DYNATUNE STORAGE MANAGER                                                                PAGE   28

LOC  OBJ CODE    R1N1M  R2N2  ADDR   STMT   SOURCE STATEMENT                    CWAX V3R2 04.34 06/10/93

0000E0 9704      7(1)         00004  6601          ARI   R7L0,4         ADD 4 FOR HEADER INFO      02470001
        0000E2 55A8      5      5            6602          SR    R5,R5          CLEAR OTHER WORK REG       02480001
        0000E4 205E      5(1)   2     0005E  6603          IC    R5L0,ANCBUFLN  LOAD BUFFER LENGTH         02490001
                                             6604          $USING 'BUFFER LENGTH',R5                       02500001
        0000E6 11A8      1      1            6605          SR    R1,R1          CLEAR LOOP COUNTER         02510001
                                             6606          $USING 'BUFFER COUNT',R1                        02520001
        0000E8                               6607  STMRENLP DS   0H                                        02530001
        0000E8 9101      1(1)         00001  6608          ARI   R1L0,1         ADD 1 TO BUFFER COUNTER    02540001
        0000EA 57A8      7      5            6609          SR    R7,R5          DEDUCT BUFFER LENGTH       02550001
        0000EC 8804                   000F2  6610          BZL   STMRENEX       SKIP IF ZERO               02560001
        0000EE 9802                   000F2  6611          BCL   STMRENEX       DITTO                      02570001
        0000F0 A80B                   000E8  6612          B     STMRENLP       SKIP                       02580001
        0000F2                               6613  STMRENEX DS   0H                                        02590001
        0000F2 41F2      1      4     00070  6614          ST    R1,DSTMLEN     SAVE BUFFER COUNT          02600001
                                             6615          $DROP R1,R5,R7                                  02610001
        0000F4 40F6      0      4     00074  6616          STZ   DSTMNMUS       SAVE IT                    02620001
                                             6617          $DROP R1,R5,R7                                  02630001
                                             6618  *                                                       02640001
        0000F6 436E      3      4     0006C  6619          L     R3,DSTMFSBF    LOAD BUFFER POINTER        02650001
                                             6620          $USING PIU4,R3                                  02660001
                                      00000  6621+         USING PIU4,R3                                   00340002
        0000F8 8836                   00130  6622          BZL   STMGEXIT       SKIP IF NONE               02670001
                                             6623  *                                                       02680001
        0000FA                               6624  STMRELLP DS   0H                                        02690001
        0000FA A304      3(1)         00004  6625          SRI   R3L0,4         BACK IT UP, BUDDY          02700001
        0000FC 3083      0      3            6626          STHZ  2(R3)          ZERO IT                    02710001
                                             6627          LA    R7,X'80C2'     LOAD EYECATCHER            02720001
                                             6628++,       LA    R7,X'80C2'   . INSTRUCTION AS CODED .
        0000FE                               6629+         DS    0H  . LA INSTRUCTION MACRO                08950000
        0000FE 000080C2                      6630+         DC    AL4(X'80C2')   . LAST 3 BYTES OF LA .     09000000
        000102                        000FE  6631+         ORG   *-4                                       09050000
        0000FE BF                            6632+         DC    AL1(184+P7)    . 1ST BYTE OF LA .         09100000
        0000FF                        00102  6633+         ORG   *+3 .                                     09150000
                                             6634          $USING 'WORK REC',R7                            02730001
        000102 3781      7      3            6635          STH   R7,0(R3)                                  02740001
        000104 9304      3(1)         00004  6636          ARI   R3L0,4         MOVE IT BACK               02750001
        000106 3082      0      3     00000  6637          STZ   U4BUFCHN       ZERO OUT STUFF             02760001
        000108 3085      0      3     00004  6638          STHZ  U4COPYF         ..                        02770001
        00010A 3089      0      3     00008  6639          STHZ  U4ECHN          ..                        02780001
        00010C 308D      0      3     0000C  6640          STHZ  U4CSTAT         ..                        02790001
        00010E 3091      0      3     00010  6641          STHZ  U1BLBBA                                   02800001
                                             6642  *                                                       02810001
        000110 4776      7      4     00074  6643          L     R7,DSTMNMUS    LOAD USED COUNT            02820001
        000112 9701      7(1)         00001  6644          ARI   R7L0,1         ADD 1 TO IT                02830001
        000114 4572      5      4     00070  6645          L     R5,DSTMLEN     LOAD BUFFER COUNT          02840001
        000116 57B8      7      5            6646          CR    R7,R5          IF AT THE LIMIT            02850001
        000118 8810                   0012A  6647          BE    STMRELRL       SKIP                       02860001
        00011A 47F6      7      4     00074  6648          ST    R7,DSTMNMUS    SAVE IT BACK               02870001
                                             6649  *                                                       02880001
        00011C 77A8      7      7            6650          SR    R7,R7          CLEAR WORK REG             02890001
        00011E 2F5E      7(1)   0     0005E  6651          IC    R7L0,ANCBUFLN  LOAD BUFFER LENGTH         02900001
        000120 3588      5      3            6652          LR    R5,R3          LOAD BUFFER POINTER        02910001
                                             6653          $USING 'NEXT BUFFER',R5                         02920001
        000122 7598      5      7            6654          AR    R5,R7          POINT TO NEXT BUFFER       02930001
        000124 3582      5      3     00000  6655          ST    R5,U4BUFCHN    SAVE IN FORWARD POINTER    02940001

07 08 93

DYNATUNE STORAGE MANAGER                                                                      PAGE   29

LOC  OBJ CODE  R1N1M  R2N2  ADDR   STMT    SOURCE STATEMENT                        CWAX V3R2 04.34 06/10/93

```
000126 5388       3     5            6656           LR    R3,R5              MAKE NEW THE CURRENT        02950001
000128 A831                    000FA 6657           B     STMRELLP                                       02960001
                                     6658 *                                                              02970001
                                     6659 * BUFFER LOOP COMPLETE - PUT BUFFERS BACK IN FREE POOL         02980001
                                     6660 *                                                              02990001
00012A                               6661 STMRELRL DS    OH                                              03000001
00012A 436E       3     4      0006C 6662          L     R3,DSTMFSBF          LOAD BUFFER POINTER        03010001
                                     6663          RELEASE (3),                                         +03020001
                                                        WORKR=(7),                                      +03030001
                                                        SUPV=NO                                          03040001
00012C                               6664+IRLS00   DS    OH       . EXIT INSTRUCTION MACRO .             04350000
00012C 0070                          6665+         DC    H'112'   . 2 BYTES EXIT .                       04400000
00012E 05                            6666+         DC    AL1(02*2+1)     SVC CODE AND COMMUNICATION      14000021
00012F 08                            6667+         DC    AL1(0*128+0*64+1*8+0)                 BITS      16000021
                                     6668          $DROP R3,R5,R7                                        03050001
                                     6669+         DROP  R3                                              00190002
                                     6670 *                                                              03060001
000130                               6671 STMGEXIT DS    OH                                              03070001
                                     6672          RESTORE (1,7,INCL),AREA=YES,RTRN=YES                  03080001
000130 6602       6     6            6673+         L     6,0(6)           POINT TO PREVIOUS SAVEAREA     46800000
000132 610E       1     6            6674+         L     1,12(6)                                         48000000
000134 6212       2     6            6675+         L     2,16(6)                                         63000000
000136 6316       3     6            6676+         L     3,20(6)                                         63000000
000138 641A       4     6            6677+         L     4,24(6)                                         63000000
00013A 651E       5     6            6678+         L     5,28(6)                                         63000000
00013C 6722       7     6            6679+         L     7,32(6) .        RESTORE REGISTER 7             53200000
00013E 600A       0     6            6680+         BND   8(6) .           RETURN TO CALLING ROUTINE      65200000
000000                               6681          END   DYTSTMGR                                        03090001
```

ERNST    G:\BMCA:085                                                                           PAGE 23

```
                                                                07 08 93

RELOCATION DICTIONARY                  PAGE   30

POS.ID  REL.ID  FLAGS  ADDRESS                          CWAX V3R2 04.34 06/10/93
 0001    0002    0C    00001A
```

ERNST    G:\BMCA:085                                              PAGE 24

What is claimed is:

1. In a computer system having memory and in which a first portion of said memory is defined as one or more resource control blocks for use by a network control program wherein said resource control blocks are initialized at program startup, a method of increasing the number or resource control blocks is defined for such use, performed by the computer system through the execution of a set of computer-program instructions, comprising:

(a) detecting a request, from a user, for said increase in the number of resource control blocks; and (b) reallocating as additional resource control blocks a second portion of said memory that, immediately prior to said reallocation, was allocated for use by the network control program other than as one or more network control program resource control blocks, said reallocation performed without regenerating said network control program.

2. The method of claim 1 wherein the user is a human user.

3. The method of claim 1 wherein at least part of said second portion of said memory is allocated for use as one or more network control program message buffers.

4. In a computer system having memory and in which a first portion of said memory is defined as one or more resource control blocks for use by a network control program wherein said resource control blocks are initialized at startup, a method of decreasing the number of resource control blocks defined for such use, performed by the computer system through the execution of a set of computer-program instructions, comprising:

(a) detecting a request, from a user, for said decrease in the number of resource control blocks; and (b) reallocating at least a part of said portion of said memory such that, immediately after said reallocation, said part of said first portion of memory is reallocated for use other than as one or more network control program resource control blocks, said reallocating performed without regenerating said network control program.

5. The method of claim 4 wherein the user is a human user.

6. The method of claim 4 wherein said at least part of said first portion of said memory is reallocated for use as one or more network control program message buffers immediately following said reallocation.

7. A program storage device that is readable by the computer system of a specified one of claims 1 through 6, said program storage device having encoded therein a program of instructions that includes instructions for executing the method steps of said specified one of claims 1 through 6.

* * * * *

UNITED STATES PATENT AND TRADEMARK OFFICE
CERTIFICATE OF CORRECTION

PATENT NO. : 6,298,371 B1
DATED : October 2, 2001
INVENTOR(S) : Theodore R. Ernst It is certified that error appears in the above-identified patent and that said Letters Patent is hereby corrected as shown below:

Column 25,
Line 4-6, delete "a network control program wherein said resource control blocks are initialized at program startup" and replace with -- an IBM NCP compatible network control program --.

Column 25, line 26 through Column 26, line 1,
Delete "a network control program wherein said resource control blocks are initialized at program startup" and replace with -- an IBM NCP compatiable network control program --.

Signed and Sealed this

Twenty-fifth Day of January, 2005

JON W. DUDAS
*Director of the United States Patent and Trademark Office*